Nov. 12, 1935.  J. B. PUMPHREY  2,020,619
PRESSURE ACTUATED SWITCHING MECHANISM
Filed Aug. 15, 1934
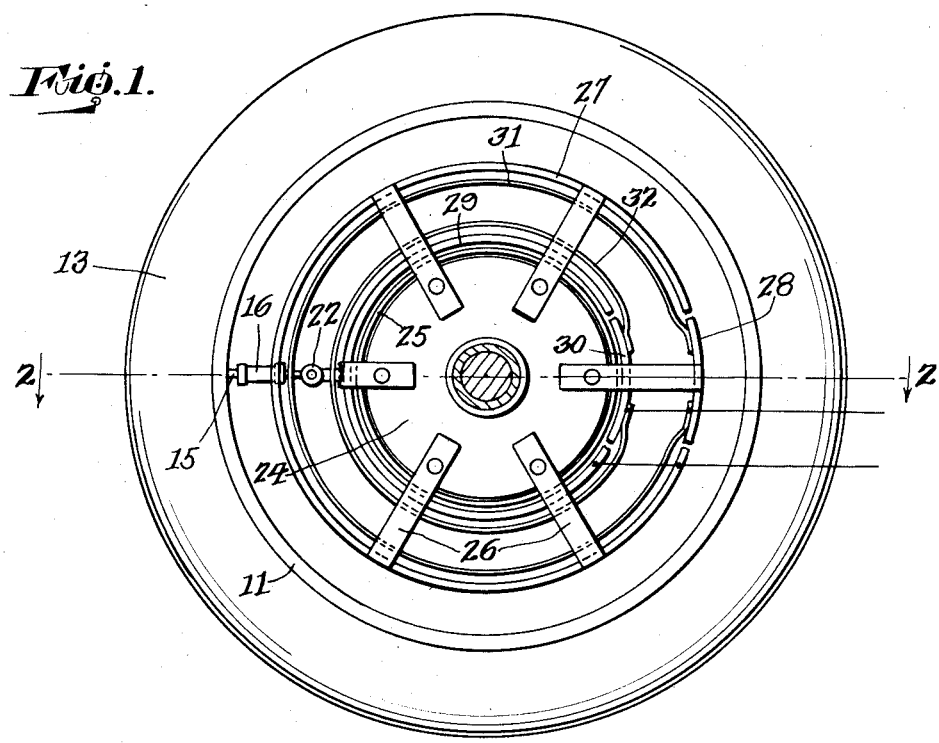
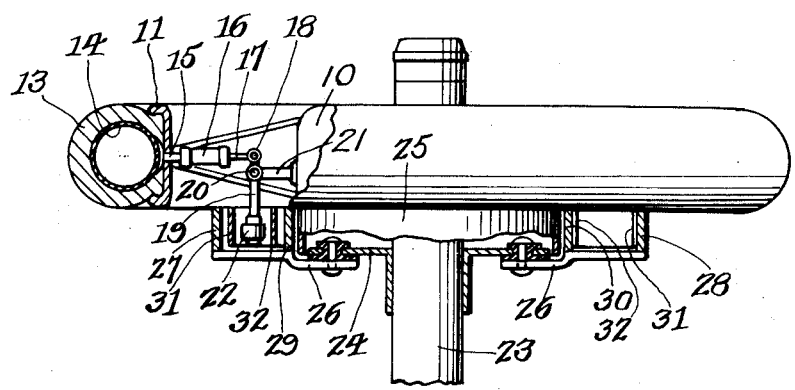
Inventor
J. B. Pumphrey
By Geo. F. Kimmel
Attorney Patented Nov. 12, 1935

2,020,619

UNITED STATES PATENT OFFICE 2,020,619

PRESSURE ACTUATED SWITCHING MECHANISM

Joseph B. Pumphrey, Abilene, Tex., assignor of one-half to Claude W. Gill and one-fourth to J. M. Hardie, Abilene, Tex.

Application August 15, 1934, Serial No. 739,948

3 Claims. (Cl. 200—58)

My invention relates to a pressure actuated switching mechanism for controlling the circuit of a signalling device, and has for its primary object to provide, in a manner as hereinafter set forth, a mechanism of the class referred to for application to a pneumatic tired wheel of a vehicle having its actuation controlled by the pressure within the tire and functioning, when actuated, to close the circuit of a tire-condition indicating signal whereby the operator of the vehicle will be warned relative to the increase or decrease of pressure above or below a desired point within the tire.

The invention further aims to provide, in a manner as hereinafter set forth, a switching mechanism for the purpose referred to which is simple in its construction and arrangement, strong, durable, compact, thoroughly efficient in its use, readily installed with respect to a wheel having a pneumatic tire, and inexpensive to manufacture.

Other objects, relating more especially to the construction, operation and advantages of my present invention, will be better understood and more thoroughly appreciated from the following detailed description thereof, reference being had to the accompanying drawing, which forms a part of this specification, and in which Figure 1 is a partially sectional side view of a pneumatic tired vehicle wheel showing the adaptation therewith of the switching mechanism, and Figure 2 is a top plan view of the structure shown in Figure 1 and partly in section along the line 2—2.

Referring to Figures 1 and 2, I have shown a wheel having a hub 10, rim 11, and tire 13, the latter including the usual tube 14 having an inflation member or valve stem 15 projecting inwardly through the rim 11. In accordance with my invention, a cylinder element 16 is threaded on the valve stem 15 and has slidably mounted therein and extended therefrom a plunger 17 pivotally connected at 18 to one end of a contact member 19. The element 16 may be in the form of a pressure gauge initially set for a greater pressure than that within the tire, and by way of example, set to five pounds more pressure than the inner tube of the tire is carrying. The plunger 17 constitutes a pressure controlled actuator for the contact member 19. This contact member, as plainly seen in Figure 2, is fulcrumed at 20 upon a post 21 secured to the wheel hub 10, the member 19 being arranged, in this way, to extend horizontally with its free end projecting beyond the inner side of the wheel. The free end of contact member 19 is provided with a roller 22 and this roller thus travels in a circumferential path and in a vertical plane offset from the inner side of the wheel.

The wheel axle 23 carries the stationary inner side plate 24 of the brake housing 25 and, according to my invention radially disposed supporting arms 26 are carried by and project from plate 24. Each arm 26 is formed of an outer portion and an inner portion. Each arm 26 has its inner portion offset to be arranged rearwardly of its outer portion. The inner portion of each arm 26 is secured to, projects beyond and is insulated from plate 24. The forward faces of the outer portions of the arms 26 have fixed thereto inner and outer concentrically arranged contact rings, radially spaced from one another, the outer ring including a long section 27 and a short section 28, and the inner ring including a long section 29 and a short section 30. As seen in Figure 1 the long and short sections of these rings are opposite one another, and to the inner opposing faces of the short sections 28 and 30 are respectively connected the slightly offset ends of outer and inner flexible contact bands 31 and 32. These bands are normally spaced throughout from the long sections 27 and 29 of the rigid contact rings and form an annular channel between them in which the contact roller 22 travels and at normal tire pressure is free of contact with either thereof.

Whenever tire pressure is increased above or decreased below, certain pressure limits, the contact lever 19 is shifted on its fulcrum 20 so that its roller 22 is forced outwardly against contact band 31 or inwardly against contact band 32, in either instance forcing the contact band against its respective ring section 27, 29 for closing a signalling circuit not shown.

It will be noted that as the short and long sections of the contact rings are normally spaced endwise and the two contact bands are secured to the short sections and normally spaced from the long sections, the two sections of each ring are only in electrical connection when the respective band is pressed against the long section thereof.

It is obvious that the necessary wheel connections may be added to a car in use with minimum difficulty and expense, and that they do not affect the turning of the wheels in any respect unless a tire signal is to be given and even then to the extent only of the slight friction of the roller 22 against one of the spring contact bands 31 and 32.

What I claim is:

1. In combination with a vehicle wheel having an inflated tire, radially spaced apart contact rings stationarily supported at one side thereof each ring consisting of a pair of endwise spaced sections, a pair of contact bands between said rings, each band having its ends secured to one of the sections of its respective ring and spaced from the other section thereof, said bands forming between them an annular unobstructed channel, a wheel carried contact for selectively shifting a contact band to engage a contact ring to close a signalling circuit.

2. In combination with a vehicle wheel having an inflated tire provided with a valve including a stem, radially spaced apart contact rings stationarily supported at one side thereof each ring consisting of a pair of endwise spaced sections, a pair of contact bands between said rings, each band having its ends secured to one of the sections of its respective ring and spaced from the other section thereof, said bands forming between them an annular unobstructed channel, a wheel carried contact member extending into said channel, and means carried by the wheel and in connection with the tire valve and in accordance with tire pressure for selectively shifting a contact band to engage a contact ring for closing a signalling circuit.

3. In combination with a vehicle wheel having an inflated tire provided with a valve including a stem, radially spaced apart contact rings stationarily supported at one side thereof each ring consisting of a pair of endwise spaced sections, a pair of contact bands between said rings, each band having its ends secured to one of the sections of its respective ring and spaced from the other section thereof, said bands forming between them an annular unobstructed channel, an oppositely shiftable contact lever fulcrumed on the wheel hub and having a roller at one end projecting into said channel to selectively shift, when the lever is operated a contact band to engage a contact ring for closing a signalling circuit, and means connected at one end thereof to the valve stem of the tire valve and having a plunger extended from its other end for operating said lever on variations in tire pressure, said plunger being pivotally connected to the other end of said lever.

JOSEPH B. PUMPHREY.